United States Patent [19]

Hiereth

[11] Patent Number: 4,590,889

[45] Date of Patent: May 27, 1986

[54] ARRANGEMENT FOR INFLUENCING A COOLING AIR FLOW

[75] Inventor: Hermann Hiereth, Esslingen, Fed. Rep. of Germany

[73] Assignee: Daimler-Benz Aktiengesellschaft, Fed. Rep. of Germany

[21] Appl. No.: 722,661

[22] Filed: Apr. 12, 1985

[30] Foreign Application Priority Data

Apr. 18, 1984 [DE] Fed. Rep. of Germany ....... 3414609

[51] Int. Cl.⁴ ................................................ F01P 5/06
[52] U.S. Cl. ............................. 123/41.05; 123/41.06; 123/41.49; 415/22; 415/145; 180/68.2
[58] Field of Search ............... 123/41.04, 41.05, 41.06, 123/41.07, 41.11, 41.49, 41.58, 41.59; 415/22, 28, 144, 145; 180/682

[56] References Cited

U.S. PATENT DOCUMENTS

| | | | |
|---|---|---|---|
| 2,388,208 | 10/1945 | Foss | 415/160 |
| 2,424,839 | 7/1947 | Morton | 123/41.58 |
| 2,523,404 | 9/1950 | Wallace | 123/41.04 |
| 3,854,459 | 12/1974 | Stimeling | 123/41.04 |
| 4,476,820 | 10/1984 | Nixon | 123/41.05 |

Primary Examiner—William A. Cuchlinski, Jr.
Attorney, Agent, or Firm—Barnes & Thornburg

[57] ABSTRACT

An arrangement for influencing a cooling air flow passing through a cooling air system of an internal-combustion engine of a vehicle includes a heat exchanger and a blower arranged in an air guiding housing, a cooling air outlet opening being arranged in the air guiding housing between the blower and a wall of an internal-combustion engine capsule in the area of the bottom side of the vehicle. In order to achieve a better efficiency of the blower and in order to prevent the emission of sounds from the ventilated capsule, pivotable guide blades are arranged in flow direction in front of and/or behind the running blades of the blower which, as a function of thir position, closes the cooling air inlet opening to the capsule and opens the cooling air outlet opening arranged in the air guiding space between the heat exchanger and the blower.

5 Claims, 1 Drawing Figure

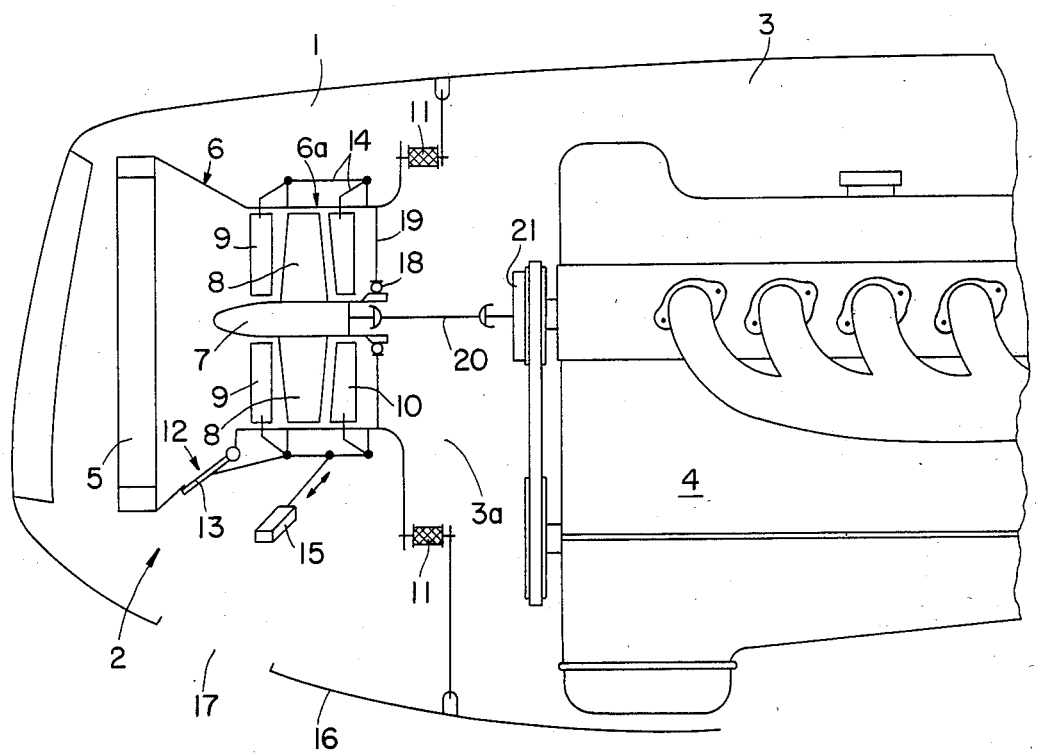

ARRANGEMENT FOR INFLUENCING A COOLING AIR FLOW

BACKGROUND AND SUMMARY OF THE INVENTION

The present invention relates to an arrangement for regulating a cooling air flow in a motor vehicle, and particularly to a vent system for diverting a cooling air flow toward the atmosphere from its normal path past a blower and through the vehicle.

On the basis of German Published Unexamined Patent Application DE-OS No. 27 40 918, an internal-combustion engine is known having a soundproof capsule and a water cooler arranged outside said capsule. A blower is arranged in an air guiding space connecting the water cooler and the capsule. Between the blower and the capsule, an air outlet opening is arranged in the air guiding space in the area of the bottom side of the vehicle. One disadvantage of this arrangement is that the blower drive during the operation of the internal-combustion engine must also be switched on during high vehicle speed because the blower is assigned directly to the water cooler and the air outlet opening is arranged in the area between the blower and the capsule. This arrangement results in an unfavorable dynamic pressure at high driving speed which is not adequate for letting a sufficient cooling air flow pass through the water cooler without the support of the blower.

Also, on the basis of German Published Unexamined Patent Application DE-OS No. 25 40 733, an axial flow blower is known that is arranged in an air guiding space. Guide blades are arranged in front of and behind the moving blades. In this case, it is a disadvantage that the guide blades are arranged rigidly and thus are arranged optimally only for a previously determined blower delivery flow.

In addition, a cooling system is known from US-PS 23 51 203 having guide blades that must be adjusted by means of an adjusting drive as a function of a parameter of the internal-combustion engine, such as the cooling water temperature.

A cooling system is known from German Published Unexamined Patent Application DE-OS No. 22 16 585 that has a heat exchanger at which an air guiding housing is fastened surrounding an axial flow blower. In the air guiding housing, a cooling air outlet opening is provided that can be closed by a closing part, the closing or opening taking place as a function of the operating condition of the vehicle.

One object of the present invention is to improve the efficiency of a blower by simple means and by these means also minimize or otherwise prevent the emergence of sounds from a ventilated capsule.

According to the present invention, a cooling air system is provided for regulating a flow of air passing through a heat exchanger mounted in a cooling system housing and discharging into an internal-combustion engine housing. The cooling system housing is formed to include an opening to the atmosphere. The improvement of the present invention includes air guiding means for conducting the flow of air from the heat exchanger to the internal-combustion engine housing along a path through the cooling system housing. The air guiding means is formed to include an outlet in communication with the atmosphere opening.

The improvement also includes a vent movable between an outlet-opening and an outlet-closing position, and guide blade means for regulating the flow of air through the air guiding means. Control means is provided for moving selectively the vent to its outlet-opening position to discharge a portion of the air flow toward the atmosphere opening via the outlet opening. The guide blade means can include at least one pivotable guide blade and the control means can be responsive to a predetermined orientation of said pivotable guide blade.

Preferred embodiments of the present invention have the advantage that, in the case of a slow flow velocity of the cooling air flow, a blower can be switched on and pivotable guide blades, which are arranged in front of and behind the moving blades of the blower, can be positioned with an adjusting drive system, in such a way that the blower operates at optimized efficiency at any flow velocity of the cooling air flow. In the case of a higher flow velocity of the cooling air flow, which occurs at a higher motor vehicle speed, the blower is switched off and the guide blades are swivelled so that no sounds can be emitted from the ventilated capsule against the flow direction from the cooling arrangement. The cooling air outlet opening is opened and the cooling air flow is carried off in the direction of the bottom side of the vehicle into a vacuum area to ensure cooling of the internal-combustion engine in the case of a dynamic pressure caused by the flow-in velocity of the cooling air.

Further objects, features, and advantages of the present invention will become more apparent from the following description when taken with the accompanying drawing which shows, for purpose of illustration only, a preferred embodiment in accordance with the present invention.

BRIEF DESCRIPTION OF THE DRAWING

The drawing shows a preferred embodiment of the present invention.

DETAILED DESCRIPTION OF THE DRAWING

In a motor vehicle that is not shown in detail, a cooling system 2 is arranged at the front side of an internal-combustion engine space 1, a ventilated capsule 3 is connected to said cooling system 2 to receive air flowing therethrough, and an internal-combustion engine 4 is arranged in said capsule 3. The cooling system 2 comprises a heat exchanger 5 and an air guiding housing 6 in which an axial flow blower 7 is arranged that has guide blades 9, 10 in front of and behind the running blades 8 of the blower 7. One side of the air guiding housing 6 is supported at the heat exchanger 5 which is fastened at the body of the motor vehicle and the other side is supported by anti-vibration pads 11 which are fastened at the body at the capsule 3. The blower 7 and the guide blades 9, 10 that are pivotably fastened in the wall of the air guiding housing 6 are located in a tube-shaped part 6a of the air guiding housing 6. An air outlet opening 12 is arranged in the air guiding housing 6 in the area between the heat exchanger 5 and the guide blades 9 in front of the blower 7 and is closable by means of a closing part 13. The closing part 13 and the guide blades 9, 10 are connected with one another by means of rods 14 at which an adjusting drive 15 is applied. An opening 17 is provided in the area of a bottom side 16 of the vehicle in proximity to the cooling air outlet opening 12. The axial flow blower 7 is disposed in a hub 18 of a spoked wheel 19 fastened in the wall of the air guiding housing 6. The axial flow blower 7 is driven by means of a single-jointed shaft 20 via a controllable coupling 21 on the side of the internal-combustion engine.

At a low vehicle speed, the blower 7 is switched on and is driven by the internal-combustion engine 4, and the cooling air outlet opening 12 is closed by means of the closing part 13.

The guide blades 9, 10 situtated in front of and behind the running blades 8 of the axial flow blower 7 are swivelled in such a way that optimal blower efficiency is obtained. The cooling air flow flows through the heat exchanger 5, flows around the first guide blades 9, is accelerated by the blower 7, flows around the other guide blades 10, and flows through an opening 3a formed jointly by the air guiding housing 6 and the capsule 3 to be discharged from the air guiding housing 6 into the capsule 3. The blower speed can be adjusted with the controllable coupling 21 as a function of the monitored parameters of a cooling cycle of the internal-combustion engine 4 which is not shown in detail.

When the vehicle speed exceeds an indicated threshold value, the blower is no longer driven and the adjusting drive 15 is operated which guides the closing part 13 so that the cooling air outlet opening 12 is exposed. The guide blades 9, 10 are swivelled at the same time so that no cooling air flow or only a slight cooling air flow enters the capsule 3. Because of the existing dynamic pressure, the cooling air flow flows through the heat exchanger 5 and is carried off in the direction of the bottom side 16 of the vehicle from the air guiding space 6 through the cooling air outlet opening 12. The cooling air flow entering the capsule 3 can be controlled as a function of operating parameter of the internal-combustion engine influencing the position of the guide blades 9, 10 via the adjusting drive 15.

Although the invention has been described in detail with reference to certain preferred embodiments and specific examples, variations and modifications exist within the scope and spirit of the invention as described and defined in the following claims.

What is claimed is:

1. In a cooling air system for regulating a flow of air passing through a heat exchanger mounted in a cooling system housing and discharging into an internal-combustion engine housing of a vehicle, the cooling system housing being formed to include an opening to the atmosphere, the improvement comprising:
   air guiding means for conducting the flow of air from the heat exchanger to the internal-combustion engine housing along a path through the cooling system housing, the air guiding means being formed to include an outlet in communication with the atmosphere opening,
   a vent movable between an outlet-opening position and an outlet-closing position,
   guide blade means for regulating the flow of air through the air guiding means, and
   control means for moving selectively the vent to its outlet-opening position to discharge a portion of the air flow toward the atmosphere opening via the outlet opening.

2. The cooling air system of claim 1, wherein the guide blade means includes at least one pivotable guide blade mounted in the air guiding means for pivotal movement between an open position and a flow-restricting position and the control means is responsive to a predetermined orientation of the at least one pivotable guide blade.

3. The cooling air system of claim 2, wherein the control means includes means for adjusting the orientation of the pivotable guide blade as a function of the speed of the vehicle so that the air flow is prevented from entering the engine housing and the vent is moved to its outlet-opening position.

4. A cooling air system for regulating a flow of air passing through a cooling system housing and discharging into an internal-combustion engine housing of a vehicle, the cooling system housing being formed to include an opening to the atmosphere, the cooling air system comprising:
   air guiding means for conducting the flow of air along a path, the air guiding means having an inlet for receiving the flow of air, a first outlet for discharging the flow of air into the engine housing, and a side wall extending between the inlet and the first outlet, the side wall being formed to include a second outlet for discharging the flow of air toward the atmosphere opening,
   a vent movable between an open position in which the second outlet is open and a closed position in which the second outlet is closed,
   blower means for drawing the flow of air through the air guiding means, the blower means being positioned within the air guiding means in proximity to the first outlet thereof, the blower means including a running blade system and a pivotable guide blade system situated in at least one of an upstream position and a downstream position in relation to the running blade system, and
   control means for moving selectively the vent to its open position to discharge a portion of the air flow toward the atmosphere opening in the cooling system housing via the second outlet, the control means being responsive to a predetermined orientation of the pivotable guide blade system.

5. The cooling air system of claim 4, wherein the control means includes means for adjusting the orientation of each pivotable guide blade system as a function of the speed of the vehicle so that air flow is prevented from entering the engine housing and the vent is moved to the second outlet-opening position.

* * * * *

UNITED STATES PATENT AND TRADEMARK OFFICE
CERTIFICATE OF CORRECTION

PATENT NO. : 4,590,889
DATED : May 12, 1986
INVENTOR(S) : Hiereth

It is certified that error appears in the above-identified patent and that said Letters Patent is hereby corrected as shown below:

Column 3, line 10, delete "situtated" and insert
--situated--.

Abstract, line 12, delete "thir" and insert --their--.

Signed and Sealed this

Second Day of September 1986

[SEAL]

Attest:

DONALD J. QUIGG

Attesting Officer   Commissioner of Patents and Trademarks